US012617201B2

(12) United States Patent
Akiyama

(10) Patent No.: US 12,617,201 B2
(45) Date of Patent: May 5, 2026

(54) IMAGE FORMING APPARATUS, IMAGE FORMING METHOD, AND COMPUTER-READABLE MEDIUM

(71) Applicant: Kohta Akiyama, Kanagawa (JP)

(72) Inventor: Kohta Akiyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 197 days.

(21) Appl. No.: 18/659,913

(22) Filed: May 9, 2024

(65) Prior Publication Data

US 2024/0383247 A1 Nov. 21, 2024

(30) Foreign Application Priority Data

May 16, 2023 (JP) ................................ 2023-081132

(51) Int. Cl.
*B41J 2/045* (2006.01)
*B41J 2/175* (2006.01)

(52) U.S. Cl.
CPC ....... *B41J 2/04581* (2013.01); *B41J 2/17566* (2013.01); *B41J 2002/17569* (2013.01); *B41J 2002/17589* (2013.01)

(58) Field of Classification Search
CPC ................ B41J 2/04581; B41J 2/17566; B41J 2002/17569; B41J 2002/17589
See application file for complete search history.

(56) References Cited

U.S. PATENT DOCUMENTS

| | | | | |
|---|---|---|---|---|
| 6,793,324 | B2 | 9/2004 | Hosono et al. | |
| 2017/0225454 | A1* | 8/2017 | Yoshida | B41J 2/17566 |
| 2017/0326874 | A1 | 11/2017 | Akiyama | |
| 2019/0217607 | A1 | 7/2019 | Akiyama et al. | |
| 2020/0171828 | A1 | 6/2020 | Matsufuji et al. | |
| 2020/0290352 | A1 | 9/2020 | Akiyama et al. | |
| 2022/0032614 | A1 | 2/2022 | Akiyama | |
| 2022/0143975 | A1 | 5/2022 | Akiyama | |
| 2023/0241890 | A1 | 8/2023 | Shingyo et al. | |
| 2023/0398780 | A1 | 12/2023 | Hatta et al. | |

FOREIGN PATENT DOCUMENTS

| | | | |
|---|---|---|---|
| JP | 2003326716 A * | 11/2003 | B41J 2/0456 |
| JP | 3772805 | 2/2006 | |
| JP | 2008-246741 | 10/2008 | |
| JP | 2002-210941 | 7/2022 | |

* cited by examiner

*Primary Examiner* — Sharon Polk
(74) *Attorney, Agent, or Firm* — Duft & Bornsen, PC

(57) ABSTRACT

An image forming apparatus includes a control unit. In a case where a total amount of liquid discharged from all of at least one liquid discharge head connected to one or more channel pipelines communicating with a tank until a predetermined first time period elapses from a first time is a first discharge amount and a total amount of liquid discharged from all of the at least one liquid discharge head connected to the one or more channel pipelines until the first time period elapses from a second time later than the first time by the first time period is a second discharge amount, the control unit is configured to adjust the discharge amount from a time later than the second time by the first time period, based on a value obtained by subtracting the second discharge amount from the first discharge amount.

9 Claims, 12 Drawing Sheets

FIG.10

| | 0 | 1000 | 2000 | 3000 | 4000 | 5000 | 6000 | 7000 | 8000 | 9000 | 10000 | 11000 | 12000 | 13000 | 14000 | 15000 |
|---|---|---|---|---|---|---|---|---|---|---|---|---|---|---|---|---|
| >15 | +18 | +15 | +9 | ±0 | -9 | -15 | -18 | -15 | -9 | ±0 | +6 | +12 | +15 | +12 | +6 | ±0 |
| >10 | +12 | +10 | +6 | ±0 | -6 | -10 | -12 | -10 | -6 | ±0 | +4 | +8 | +10 | +8 | +4 | ±0 |
| >5 | +6 | +5 | +3 | ±0 | -3 | -5 | -6 | -5 | -3 | ±0 | +2 | +4 | +5 | +4 | +2 | ±0 |
| <-5 | -6 | -5 | -3 | ±0 | +3 | +5 | +6 | +5 | +3 | ±0 | -2 | -4 | -5 | -4 | -2 | ±0 |
| <-10 | -12 | -10 | -6 | ±0 | +6 | +10 | +12 | +10 | +6 | ±0 | -4 | -8 | -10 | -8 | -4 | ±0 |
| <-15 | -18 | -15 | -9 | ±0 | +9 | +15 | +18 | +15 | +9 | ±0 | -6 | +12 | -15 | -12 | -6 | ±0 |

IMAGE FORMING APPARATUS, IMAGE FORMING METHOD, AND COMPUTER-READABLE MEDIUM

CROSS-REFERENCE TO RELATED APPLICATIONS

The present application claims priority under 35 U.S.C. § 119 to Japanese Patent Application No. 2023-081132, filed on May 16, 2023. The contents of which are incorporated herein by reference in their entirety.

BACKGROUND OF THE INVENTION

1. Field of the Invention

The present invention relates to an image forming apparatus, an image forming method, and a computer-readable medium.

2. Description of the Related Art

Increase in the flow rate of liquid, such as ink, flowing through an ink feeding channel to a liquid discharge head used in an image forming apparatus for high speed printing leads to increase in pressure fluctuation that occurs in the ink feeding channel and to a problem of causing density variation in a discharge image and reducing the image quality until pressure oscillation caused by the pressure fluctuation is damped. Techniques have been developed to address this problem, the techniques being for reducing the pressure fluctuation by making the ink feeding channel thicker, making the ink feeding channel shorter, or providing, near the liquid discharge head, a damper to alleviate the pressure fluctuation.

In a control method disclosed in Japanese Patent No. 3772805, for the purpose of correcting a change in liquid volume that occurs upon high-frequency driving, the amount of liquid droplets discharged is actually measured for each head at the time of high-frequency driving, a frequency characteristic ink amount ID is set for each head, and correction is performed.

However, making the ink feeding channel thicker according to the above mentioned technique increases the size of the image forming apparatus. Furthermore, making the ink feeding channel shorter or providing the damper near the liquid discharge head obstructs placement of the liquid discharge head and the above mentioned technique thus fails to be adapted to increases in fluctuation of the flow rate due to the recent improvement in the printing speed and may still have image degradation.

The technique described in Japanese Patent No. 3772805 fails to stop the density variation in an image due to the pressure fluctuation before the pressure oscillation caused in the ink feeding channel is damped. Specifically, the technique described in Japanese Patent No. 3772805 enables correction of a density change due to the frequency characteristic of the head, the density change being caused while driving is performed at each frequency when the drive frequency of a particular discharge is changed, but it is still difficult, with the technique described in Japanese Patent No. 3772805, to reduce the density variation in a printed image caused by damped oscillation of pressure generated in the ink feeding channel.

The present invention has been made in view of the above, and an object thereof is to provide an image forming apparatus, an image forming method, and a program that enable, for image forming apparatuses with improved printing speed, prevention of increase in sizes of their bodies and reduction of density variation in images due to pressure fluctuation that occurs in their ink feeding channels.

SUMMARY OF THE INVENTION

According to an aspect of the present invention, an image forming apparatus includes a tank, one or more channel pipelines, at least one liquid discharge head, a detection unit, and a control unit. The tank is configured to hold liquid. The one or more channel pipelines communicate with the tank. The at least one liquid discharge head is connected to the one or more channel pipelines and configured to discharge the liquid held in the tank. The detection unit is configured to detect a discharge amount of liquid discharged per predetermined time period from the at least one liquid discharge head. The control unit is configured to adjust the discharge amount. In a case where a total amount of liquid discharged from all of the at least one liquid discharge head connected to the one or more channel pipelines until a predetermined first time period elapses from a first time is a first discharge amount and a total amount of liquid discharged from all of the at least one liquid discharge head connected to the one or more channel pipelines until the first time period elapses from a second time later than the first time by the first time period is a second discharge amount, the control unit is configured to adjust the discharge amount from a time later than the second time by the first time period, based on a value obtained by subtracting the second discharge amount from the first discharge amount.

BRIEF DESCRIPTION OF THE DRAWINGS

FIG. 10 is a diagram illustrating an example of a correction table that the image forming apparatus according to the first embodiment has;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
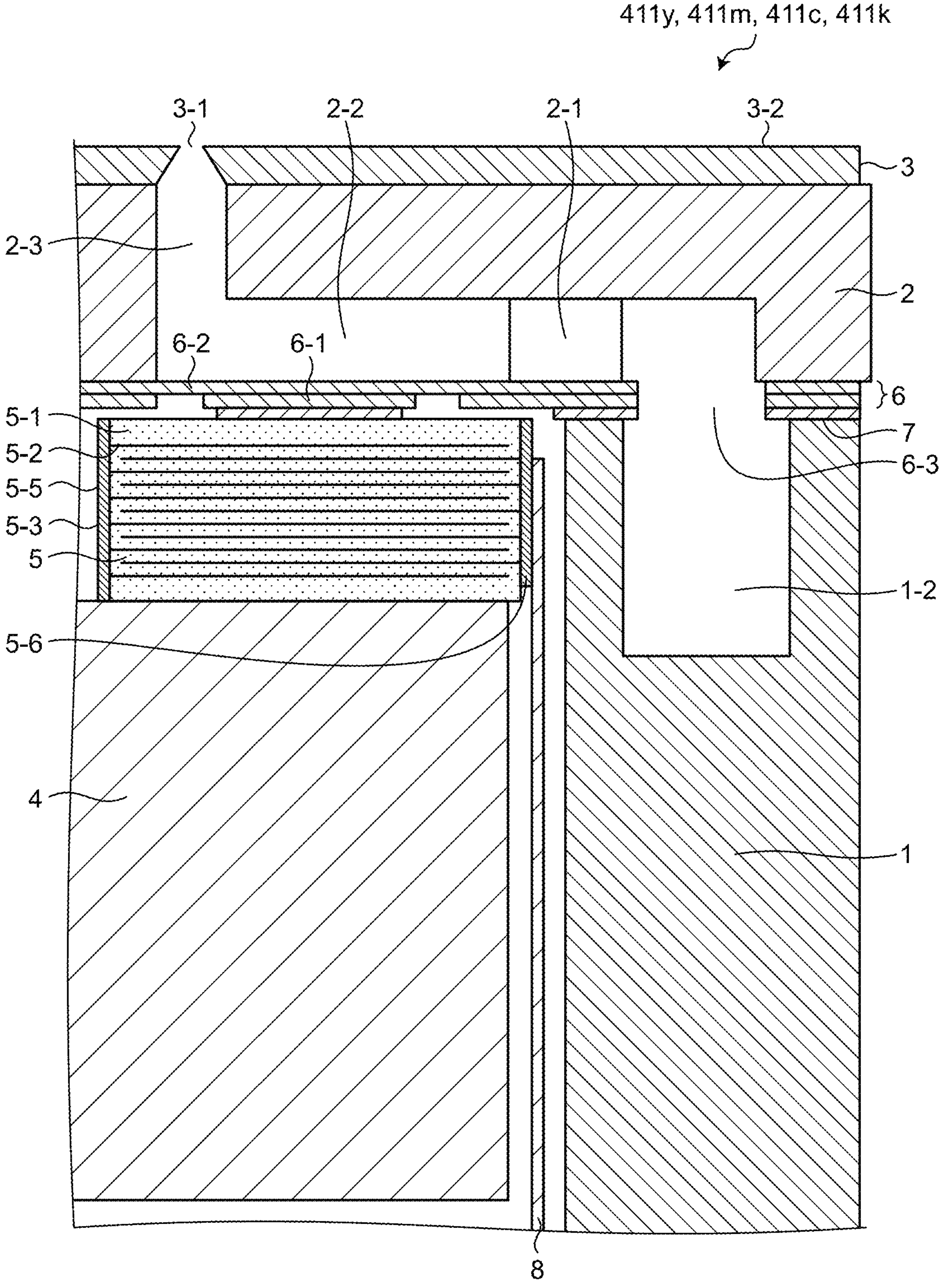
FIG. 1 is a diagram illustrating an example of a cross section of a liquid discharge head forming a recording head of an image forming apparatus according to a first embodiment, the cross section being along a longitudinal direction of a liquid chamber of the liquid discharge head.

The terminology used herein is for the purpose of describing particular embodiments only and is not intended to be limiting of the present invention.

As used herein, the singular forms “a”, “an” and “the” are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide an image forming apparatus, an image forming method, and a computer-readable medium that enable, for image forming apparatuses with improved printing speed, prevention of increase in sizes of their bodies and reduction of density variation in images due to pressure fluctuation that occurs in their ink feeding channels.

Embodiments of an image forming apparatus, an image forming method, and a program will hereinafter be described in detail by reference to the appended drawings.

First Embodiment

Figure 2:
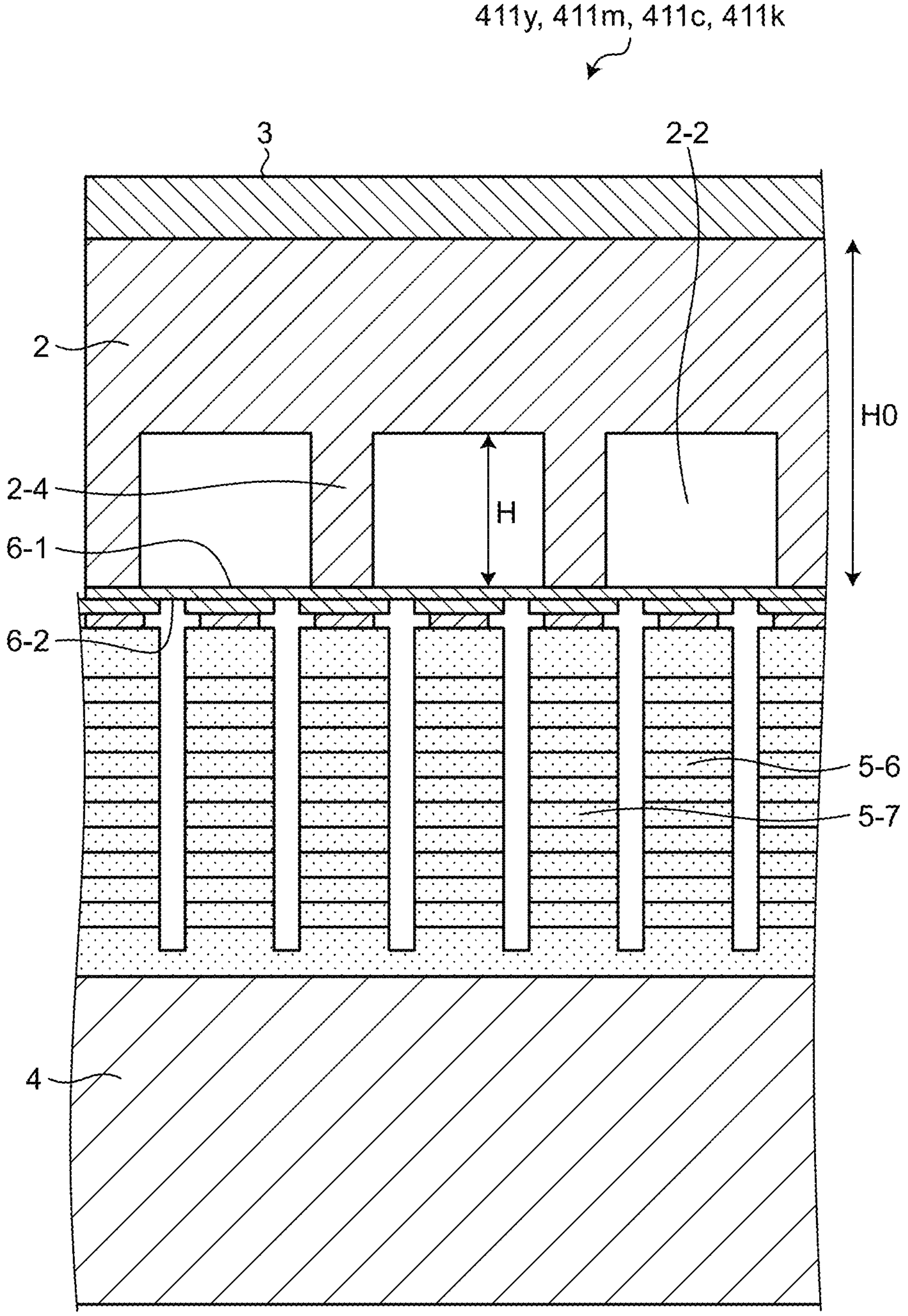
FIG. 2 is a diagram illustrating an example of a cross section of the liquid discharge head forming the recording head of the image forming apparatus according to the first embodiment, the cross section being along a transverse direction of the liquid chamber of the liquid discharge head.
Figure 3:
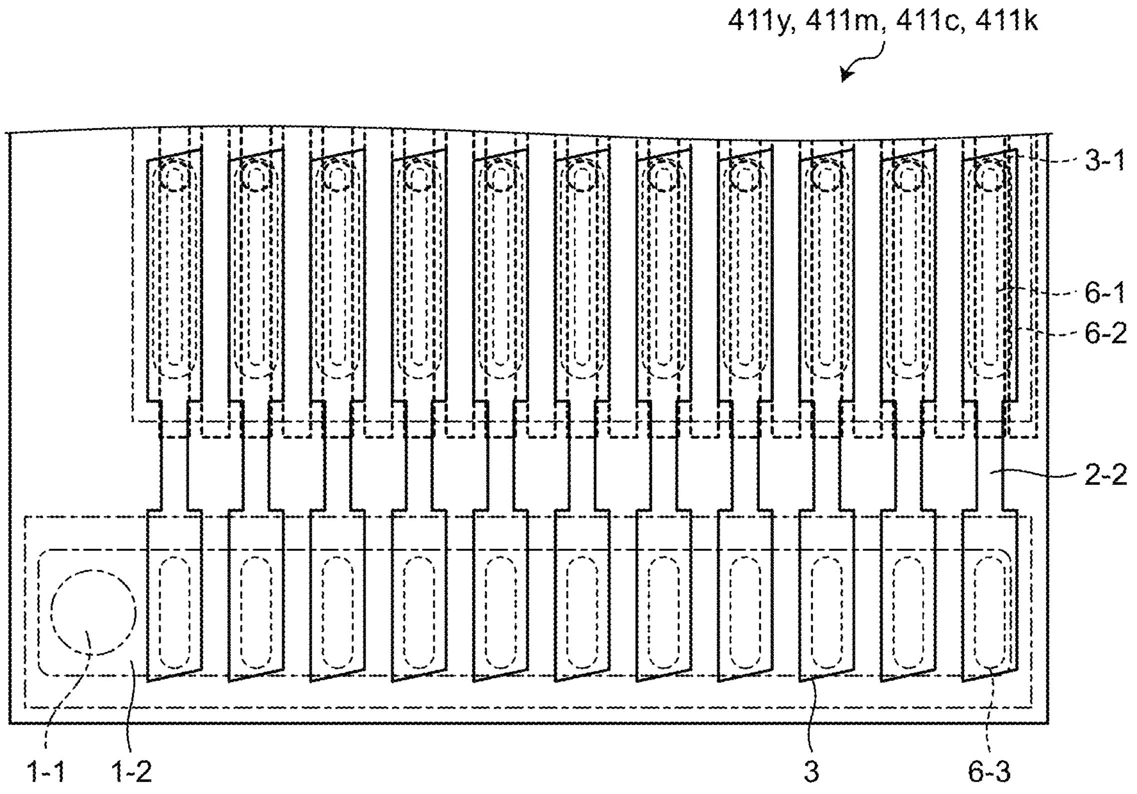
FIG. 3 is a diagram illustrating an example of a cross section of the liquid discharge head forming the recording head of the image forming apparatus according to the first embodiment, the cross section being along a planar direction of the liquid chamber of the liquid discharge head.

FIG. 1 is a diagram illustrating an example of a cross section of a liquid discharge head forming a recording head of an image forming apparatus according to a first embodiment, the cross section being along a longitudinal direction of a liquid chamber of the liquid discharge head. FIG. 2 is a diagram illustrating an example of a cross section of the liquid discharge head forming the recording head of the image forming apparatus according to the first embodiment, the cross section being along a transverse direction of the liquid chamber of the liquid discharge head. FIG. 3 is a diagram illustrating an example of a cross section of the liquid discharge head forming the recording head of the image forming apparatus according to the first embodiment, the cross section being along a planar direction of the liquid chamber of the liquid discharge head.

Liquid discharge heads (ink jet heads) 411*y*, 411*m*, 411*c*, and 411*k* (hereinafter, each referred to as a liquid discharge head 411 when they are not distinguished from one another), which are an example of recording heads that the image forming apparatus according to the first embodiment has, each include: a frame 1 having a cavity formed therein, the cavity including an ink feeding opening 1-1 and a common liquid chamber 1-2; a channel plate 2 having a cavity and a communicating opening 2-3 formed therein, the cavity including a fluid resistance portion 2-1 and a pressure generation chamber 2-2, the communicating opening 2-3 communicating with nozzles 3-1; a nozzle plate 3 having the nozzles 3-1 formed therein; a vibration plate 6 having a protruded portion 6-1, a diaphragm portion 6-2, and an ink inflow opening 6-3; stacked piezoelectric elements 5 that have been bonded to the vibration plate 6 via an adhesive layer 7; and a base where the stacked piezoelectric elements 5 are fixedly mounted. The base 4 is made of barium titanate-based ceramic, for example, and has the stacked piezoelectric elements 5 in two rows arranged thereon and bonded thereto.

The stacked piezoelectric elements 5 have piezoelectric layers 5-1 and internal electrode layers 5-2 alternately stacked over each other, the piezoelectric layers 5-1 each having a thickness of 10 to 50 μm and being made of lead zirconate titanate (PZT), the internal electrode layers 5-2 each having a thickness of a few micrometers and being made of silver and palladium (AgPd). The internal electrode layers 5-2 are connected to external electrodes 5-3 at both ends of the internal electrode layers 5-2.

The stacked piezoelectric elements 5 are divided in a comb-like shape by half-cut dicing and used as driving portions 5-6 and supporting portions 5-7 (non-driving portions) that are alternately arranged. A length of an outer side of the external electrodes 5-3 is limited by machining such as notching, so as to be divided by half-cut dicing, and the divided external electrodes 5-3 serve as a plurality of individual electrodes 5-4. The other is electrically connected without being divided by dicing and serves as a common electrode 5-5.

An FPC 8 has been bonded by solder to the individual electrodes 5-4 of the driving portions 5-6. Furthermore, the common electrode 5-5 has been bonded to a Gnd electrode of the FPC 8 by providing an electrode layer at an end portion of the stacked piezoelectric elements 5 and routing. A driver IC has been mounted on the FPC 8 and application of driving voltage to the driving portions 5-6 is thereby controlled.

The vibration plate 6 has, formed therein, by superimposition of two Ni plated films on each other by electroforming, the diaphragm portion 6-2, which is film-like, the protruded portion (island portion) 6-1, which is island-like, a thick film portion including a beam to be bonded to a support portion 18, and an opening serving as the ink inflow opening 6-3. The diaphragm portion 6-2 has a thickness of 3 μm and a width (one side) of 35 μm.

Bonding between the island-like protruded portion 6-1 of the vibration plate 6 and the driving portions 5-6 of the stacked piezoelectric elements 5, and bonding between the vibration plate 6 and the frame 1 are implemented by patterning of the adhesive layer 7 including a gap material.

The channel plate 2 is obtained by patterning of a silicon single crystal substrate, through etching, to form the cavity serving as the fluid resistance portion 2-1 and the pressure generation chamber 2-2 and a through opening serving as the communicating opening 2-3 at a position corresponding to the nozzles 3-1. The portion remaining after the etching serves as partition walls 2-4 in the pressure generation chamber 2-2. Furthermore, a portion having a smaller etching width is provided in the liquid discharge head 411, the portion serving as the fluid resistance portion 2-1.

The nozzle plate 3 has been formed of a metallic material, for example, a Ni plated film formed by electroforming, and has multiple nozzles 3-1 formed therein, the multiple nozzles 3-1 being very small discharge openings for sputtering ink droplets. The nozzles 3-1 each have an internal shape (inner shape) formed in a horn shape (or an approximate cylinder shape or an approximate circular truncated cone shape). Furthermore, the nozzles 3-1 each have a diameter of about 20 to 35 μm at an ink droplet exit end thereof. Furthermore, each row has a nozzle pitch of 150 dpi.

An ink discharging surface (a nozzle surface side) of the nozzle plate 3 has a water repellent layer 3-2 provided thereon by water-repellency surface treatment. A water repellent film selected according to physical properties of the ink is provided to stabilize the ink droplet shape and ink sputtering characteristic and achieve high image quality, the water repellent film being, for example, a film obtained by PTFE-Ni eutectoid plating, electrodeposition of fluoroplastic, vapor deposition coating with evaporative fluoroplastic (for example, pitch fluoride), or baking of silicone-based resin or fluorine-based resin after application of solvent thereto.

The frame 1 having, formed therein, the cavity serving as the ink feeding opening 1-1 and the common liquid chamber 1-2 is made by resin molding. In the liquid discharge head (ink jet head) 411 configured as described above, application of a drive waveform (a pulse voltage of 10 to 50 V) to the driving portions 5-6 according to a recording signal results in displacement of the driving portions 5-6 in a stacking direction, application of pressure to the pressure generation chamber 22 via the vibration plate 6 and increase in pressure, and discharge of ink droplets from the nozzles 3-1. That is, the liquid discharge head 411 is an example of at least one liquid discharge head that discharges liquid, such as ink, held in liquid tanks 414*k*, 414*c*, 414*m*, and 414*y* (see FIG. 4).

Thereafter, as the discharge of ink droplets is finished, ink pressure in the pressure generation chamber 2-2 is reduced, negative pressure is generated in the pressure generation chamber 2-2 due to inertia of flow of the ink and an electric discharge process of a drive pulse, and a process of filling with ink is started. In this process, ink fed from an ink feeding channel flows into the common liquid chamber 1-2, passes through the fluid resistance portion 2-1 from the common liquid chamber 1-2 via the ink inflow opening 6-3, and the pressure generation chamber 2-2 is then filled with the ink.

The fluid resistance portion 2-1 has an effect on damping of residual pressure oscillation after the discharge of ink, but serves as resistance to refilling due to surface tension. Selecting a fluid resistance portion appropriately enables balancing between damping of residual pressure and the refill time period, and reduction in the time period (drive period) up to a transition to the next ink droplet discharge operation.

Figure 4:
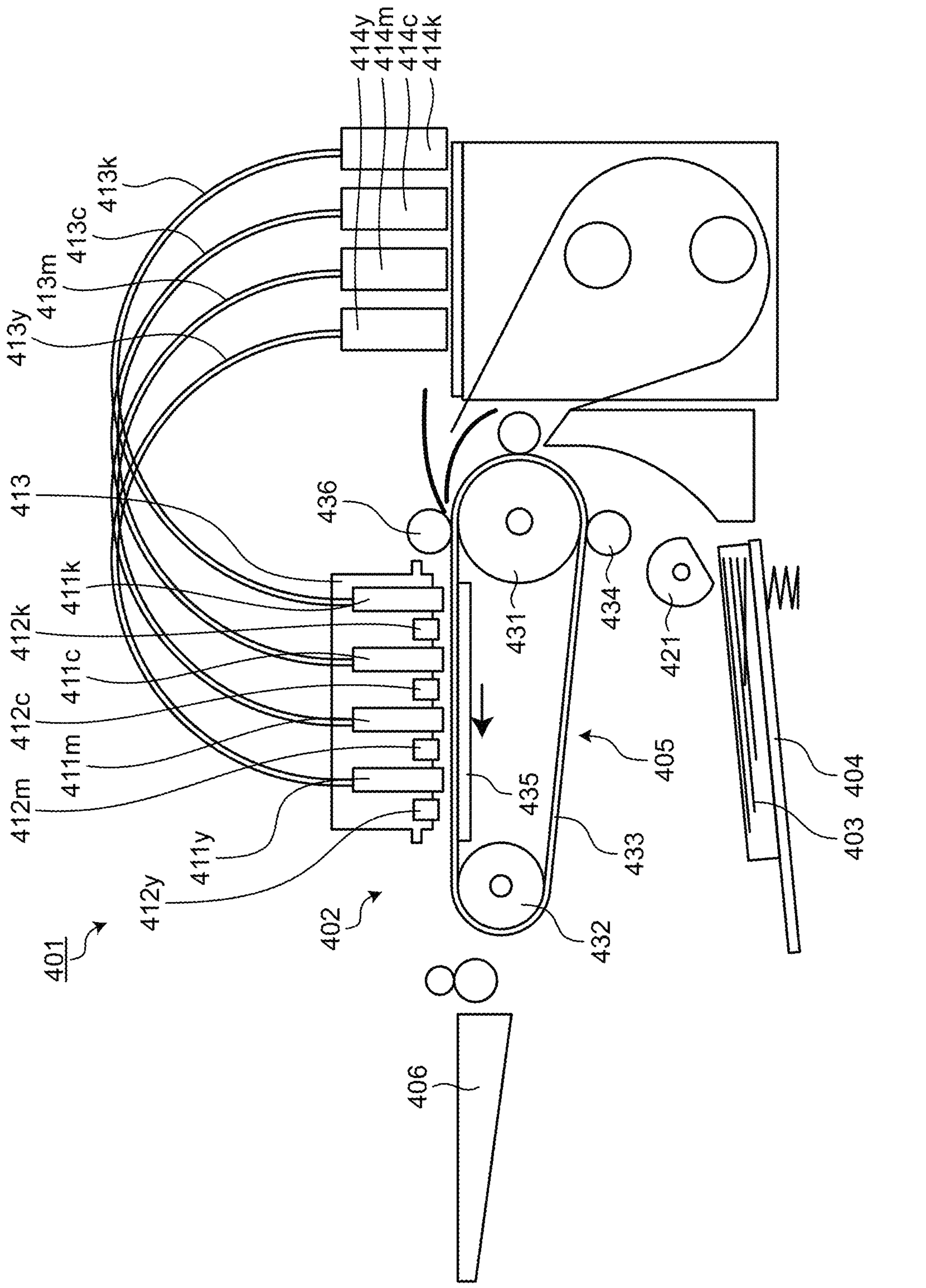
FIG. 4 is a diagram of a schematic configuration of an example of the image forming apparatus according to the first embodiment.

FIG. 4 is a diagram of a schematic configuration of an example of the image forming apparatus according to the first embodiment. An example of an image forming apparatus including a liquid discharge apparatus including the liquid discharge heads 411*y*, 411*m*, 411*c*, and 411*k* according to the embodiment will be described next by reference to FIG. 4.

This image forming apparatus is a line-type image forming apparatus including full line-type heads, has, inside an apparatus body 401, an image forming unit 402 and a sub-scanning conveyance mechanism 405 that conveys sheets of paper 403, includes a sheet feeding tray 404 where a large number of the sheets of paper 403 is able to be loaded, the sheet feeding tray 404 being near one end of the apparatus body 401, takes in a sheet of paper 403 fed from the sheet feeding tray 404, records a predetermined image by means of the image forming unit 402 while conveying the sheet of paper 403 by means of the sub-scanning conveyance mechanism 405, and thereafter ejects the sheet of paper 403 to a sheet ejection tray 406 installed near the other end of the apparatus body 401.

The image forming unit 402 includes the liquid discharge heads 411*y*, 411*m*, 411*c*, and 411*k* that are line-type heads having nozzle rows corresponding to a length of a sheet of paper, the length being in a width direction (a direction orthogonal to a conveyance direction), the liquid discharge heads 411*y*, 411*m*, 411*c*, and 411*k* being where ink is fed through ink feeding tubes 413*k*, 413*c*, 413*m*, and 413*y* from the liquid tanks 414*k*, 414*c*, 414*m*, and 414*y* containing liquid serving as recording liquid. In this embodiment, the liquid tanks 414*k*, 414*c*, 414*m*, and 414*y* are an example of tanks that hold liquid. Furthermore, in this embodiment, the ink feeding tubes 413*k*, 413*c*, 413*m*, and 413*y* are an example of one or more channel pipelines communicating with the liquid tanks 414*k*, 414*c*, 414*m*, and 414*y*. These line-type heads (liquid discharge heads) 411 have been installed in a head holder.

A plurality of liquid discharge heads 411 may be arranged to match the width of sheets of paper, the liquid tanks 414*k*, 414*c*, 414*m*, and 414*y* and the ink feeding tubes 413*k*, 413*c*, 413*m*, and 413*y* do not need to respectively correspond to different colors, and as the ink feeding tubes 413*k*, 413*c*, 413*m*, and 413*y* and the liquid tanks 414*k*, 414*c*, 414*m*, and 414*y* connected thereto, a plurality ink feeding tubes and a plurality of liquid tanks may be installed for each of different colors when forming line-type heads having a plurality of the liquid discharge heads 411 arranged therein.

The liquid discharge heads 411*y*, 411*m*, 411*c*, and 411*k* respectively discharge, from an upstream end of a sheet of paper, yellow, magenta, cyan, and black liquid droplets (for example, ink droplets) in this order in the conveyance direction, for example. The sheets of paper 403 on the sheet feeding tray 404 are separated one by one by a sheet feeding roller 421 and fed into the apparatus body 401, and sent to the sub-scanning conveyance mechanism 405 by a sheet feeding roller.

This sub-scanning conveyance mechanism 405 includes: a conveyance belt 433 wound around and between a drive roller 431 and a driven roller 432, a charging roller 436 to charge the conveyance belt 433; a guide member (platen plate) 435 that guides the conveyance belt 433 at a portion opposite to the image forming unit 402; a recording liquid wiping member (herein, a cleaning roller) that is a cleaning means for removing recording liquid (ink) adhering to the conveyance belt 433 and is made of a porous body, for example; a discharging roller 434 mainly made of electrically conductive rubber to discharge the sheet of paper 403; and a sheet pressing roller 430 that presses the sheet of paper 403 toward the conveyance belt 425. Furthermore, downstream from the sub-scanning conveyance mechanism 405, a sheet ejection roller for sending the sheet of paper 403 to the sheet ejection tray 406 is included, the sheet of paper 403 having an image recorded thereon.

In the line-type image forming apparatus configured as described above also, charging the conveyance belt 433 and sending a sheet of paper 403 to the charged conveyance belt 433 causes the sheet of paper 403 to be attracted to the conveyance belt 433 by electrostatic force, the attracted sheet of paper 403 is conveyed by rotational movement of the conveyance belt 433, an image is formed on the conveyed sheet of paper 403 by the image forming unit 402, and the sheet of paper 403 is then ejected to the sheet ejection tray 406.

Figure 5:
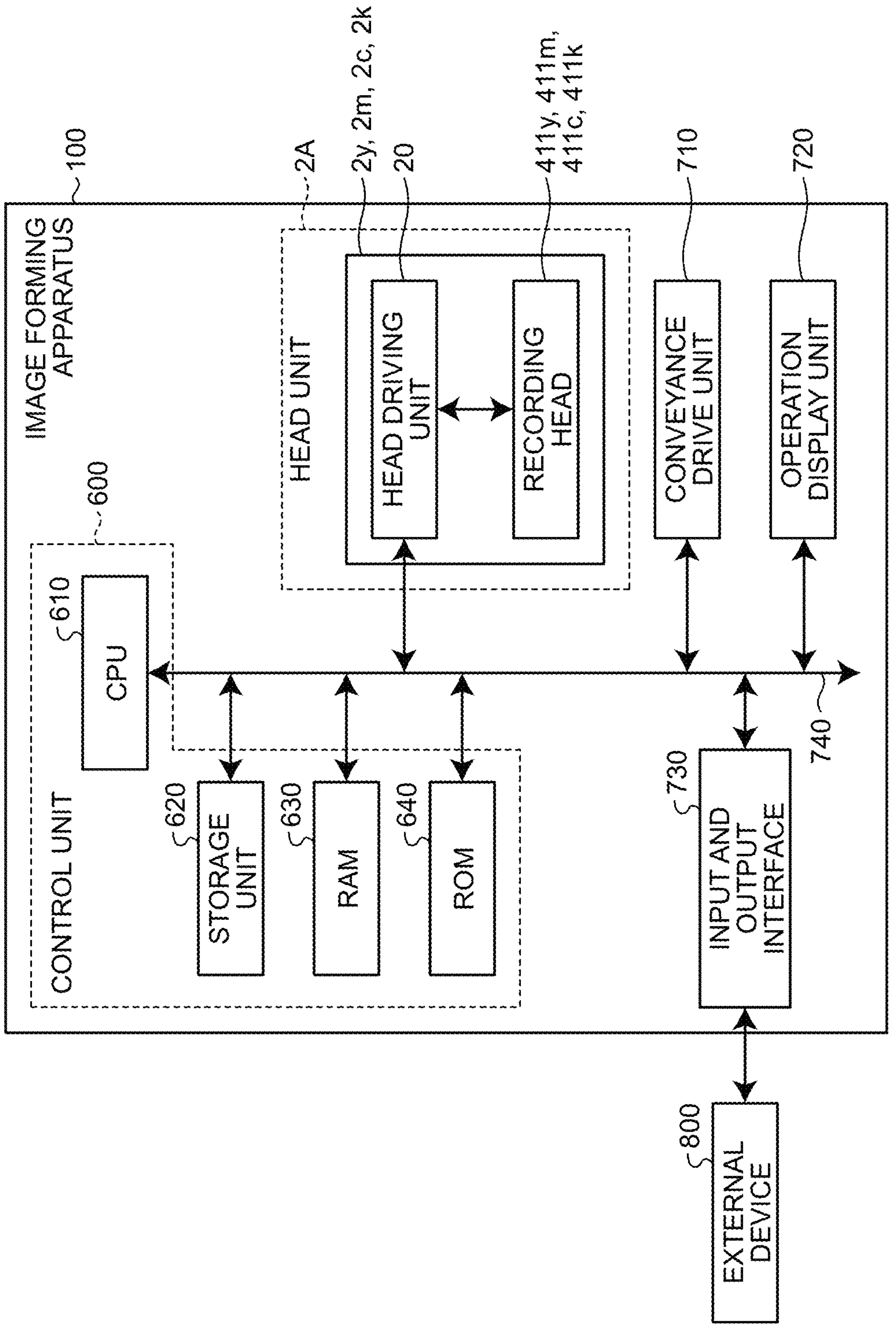
FIG. 5 is a block diagram illustrating an example of a hardware configuration of a control system of the image forming apparatus according to the first embodiment.

FIG. 5 is a block diagram illustrating an example of a hardware configuration of a control system of the image forming apparatus according to the first embodiment. An image forming apparatus 100 according to the embodiment is configured to have, in addition to a head unit 2A including the liquid discharge heads (recording heads) 411*y*, 411*m*, 411*c*, and 411*k* described above, a control unit 600, a conveyance drive unit 710, an operation display unit 720, and an input and output interface 730 connected to one another via a bus line 740.

The head unit 2A includes a head driving unit 20 that drives the liquid discharge heads (for example, line-type recording heads) 411*y*, 411*m*, 411*c*, and 411*k* arranged in recording units 2*y*, 2*m*, 2*c*, and 2*k* of different colors. The head driving unit 20 generates a drive waveform that causes deformation operation of piezoelectric elements that are electromechanical transducer elements serving as actuators in the liquid discharge heads 411*y*, 411*m*, 411*c*, and 411*k* of the recording units 2*y*, 2*m*, 2*c*, and 2*k* according to a control signal input from the control unit 600. Input of the drive waveform to the piezoelectric elements of the liquid discharge heads 411*y*, 411*m*, 411*c*, and 411*k* of the recording units 2*y*, 2*m*, 2*c*, and 2*k* causes pressure to be applied to liquid, such as ink, in the pressure generation chamber 2-2 communicating with the nozzles 3-1, discharge energy to be applied thereto, and ink to be discharged from the corresponding nozzles 3-1.

The control unit 600 has a central processing unit (CPU) 610, a storage unit 620, a random access memory (RAM) 630, and a read only memory (ROM) 640. The CPU 610 reads a program and setting data for various kinds of control, the program and setting data having been stored in the ROM 640, stores the read program and setting data into the RAM 630, executes the stored program, and performs various kinds of calculation processing. Furthermore, the CPU 610 controls the overall operation of the image forming apparatus 100.

The storage unit 620 has, stored therein, a print job (image recording command) input via the input and output interface 730, image data (image information) to be printed, and a nozzle switching position set on the basis of a nozzle switching position detection pattern (discharge position pattern) described later. The conveyance drive unit 710 supplies a drive signal to a conveyance motor on the basis of a control signal supplied from the control unit 600 and conveys a recording medium, such as a sheet of paper 403, at a predetermined velocity and a time.

The operation display unit 720 includes a display device, such as a liquid crystal display or an organic EL display, and an input device, such as operation keys and a touch panel arranged to be superimposed on a screen of the display device. The operation display unit 720 causes the display device to display various kinds of information and supplies an operation signal to the control unit 600, the operation signal corresponding to operation that a user inputs through the input device.

The input and output interface 730 mediates transmission and reception of data between an external device 800 and the control unit 600. The bus line 740 is a line for transmission and reception of signals between the control unit 600 and other components.

In the line-type image forming apparatus 100 described above, a lot of liquid, such as ink, is discharged from the liquid discharge heads (line-type heads) 411 per unit time period when an image is formed at high speed. Therefore, increase in the flow rate of ink flowing through the ink feeding channel increases pressure fluctuation generated in the ink feeding channel, and the increased pressure fluctuation leads to a problem that until pressure oscillation caused by the pressure fluctuation is damped, density variation is generated in the discharge image and the image quality is degraded.

What have been considered conventionally to address this problem include reducing the pressure fluctuation by making the ink feeding channel thick, making the ink feeding channel short, or providing, near the liquid discharge head 411, a damper to alleviate the pressure fluctuation. However, making the ink feeding channel thick or providing the damper near the liquid discharge head 411 would increase the size of the image forming apparatus 100, and making the ink feeding channel short would not enable an appropriate layout of the liquid discharge heads 411 and the liquid tanks 414*k*, 414*c*, 414*m*, and 414*y*. Therefore, these conventional means have a problem of still not being able to be adapted to the increase in the fluctuation of the flow rate due to the recent improvement in the printing speed and still resulting in degradation of images.

Figure 6:
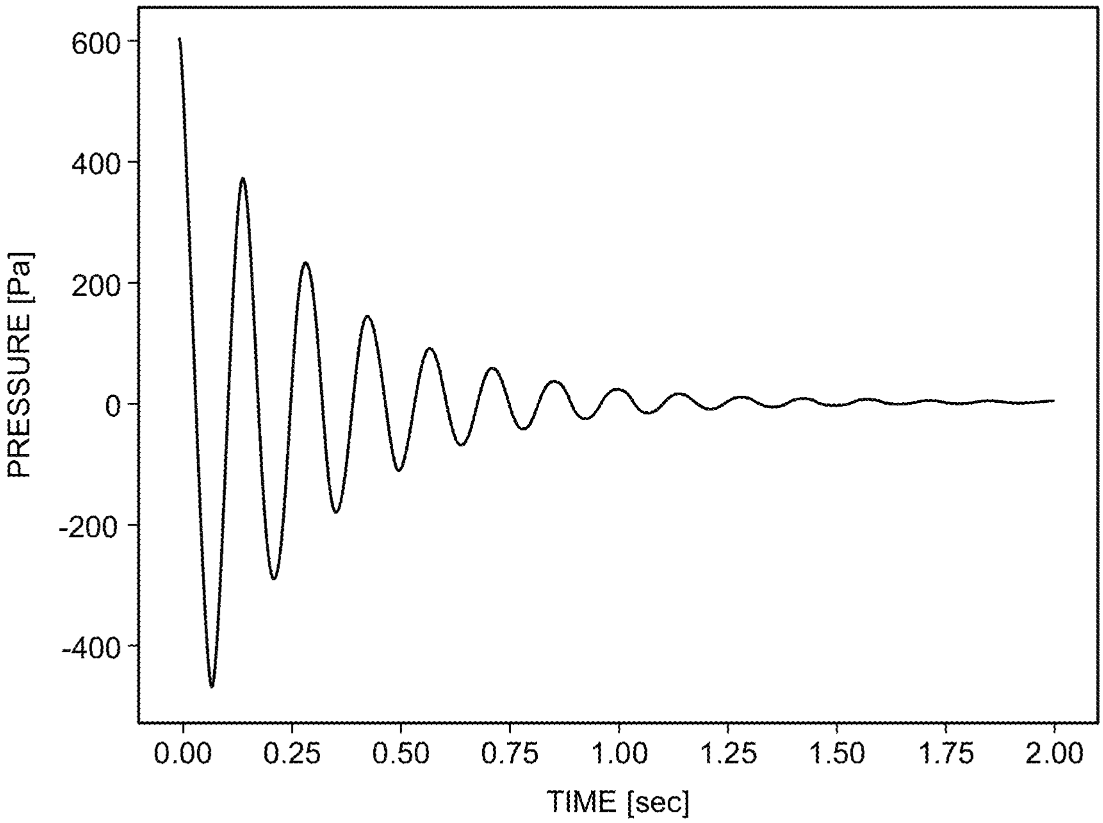
FIG. 6 is a diagram illustrating an example of fluctuation in pressure applied to the liquid discharge head after stoppage of high speed printing.
Figure 7:
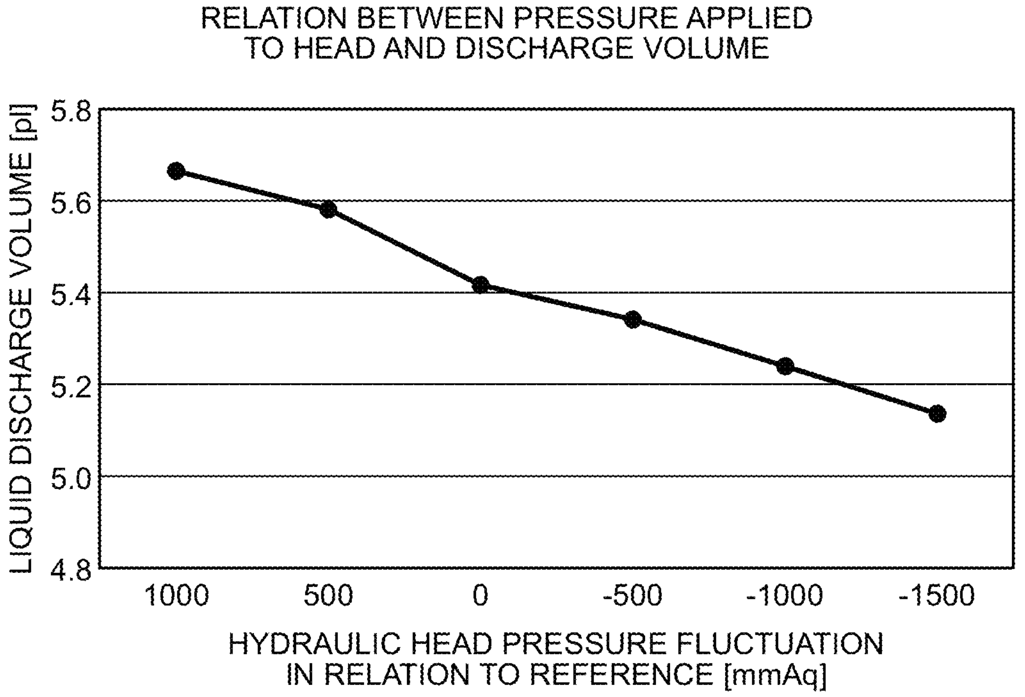
FIG. 7 is a diagram illustrating an example of a relation between fluctuation in pressure applied to the liquid discharge head and discharge volume of ink droplets (liquid) discharged from the liquid discharge head.

FIG. 6 is a diagram illustrating an example of fluctuation in pressure applied to a liquid discharge head after stoppage of high speed printing. In FIG. 6, the vertical axis represents pressure applied to a liquid discharge head 411 and the horizontal axis represents time. FIG. 7 is a diagram illustrating an example of a relation between fluctuation in pressure applied to the liquid discharge head and discharge volume of ink droplets (liquid) discharged from the liquid discharge head. In FIG. 7, the vertical axis represents volume of ink droplets (ink droplet discharge volume) discharged from the liquid discharge head 411 and the horizontal axis represents fluctuation in pressure (hydraulic head pressure) relative to a preset reference (reference pressure). The principle of fluctuation in pressure applied to the liquid discharge head 411 will be described next by use of FIG. 6 and FIG. 7.

In the liquid discharge head 411, in response to a change in the flow rate of liquid, such as ink, flowing to the liquid discharge head 411 upon start of printing from a state where printing has been stopped or upon a change in print duty during printing, fluctuation in pressure due to inertia of the ink in the channel pipeline to the liquid discharge head 411 is generated. This pressure oscillation is damped oscillation (see FIG. 6) having a period specific to the ink feeding channel. The period of the pressure oscillation is in a range of a few ten milliseconds to a few hundred milliseconds. This pressure oscillation propagates to the liquid discharge head 411.

In response to fluctuation of pressure of ink flowing to the liquid discharge head 411, the nozzle meniscus position changes and the liquid droplet discharge volume (Mj) discharged from the liquid discharge head 411 thereby varies (see FIG. 7). Specifically, as the pressure increases, the nozzle meniscus position moves outward from the nozzles 3-1, more ink is discharged from the nozzles 3-1, and the liquid droplet discharge volume increases.

When the liquid droplet discharge volume changes, the diameter of dots on a medium where an image is formed changes and the density of the image thus changes. Therefore, the pressure oscillation generates change in the density of the image with the same period.

Figure 8:
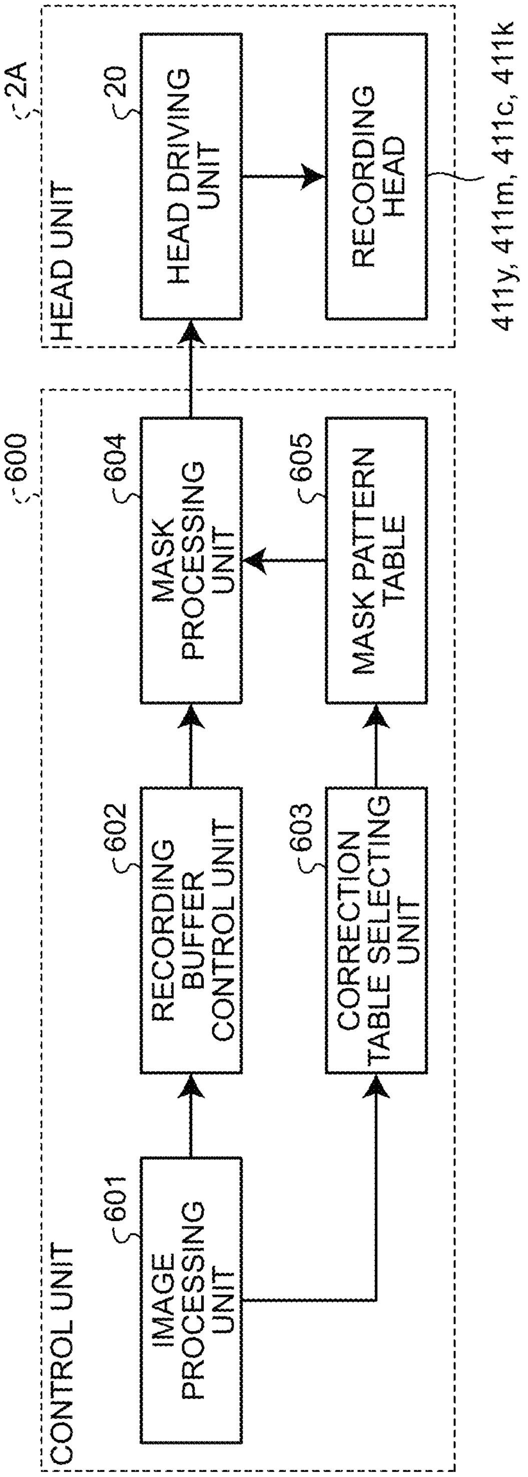
FIG. 8 is a functional block diagram illustrating an example of a functional configuration inside a control unit of the image forming apparatus according to the first embodiment.

FIG. 8 is a functional block diagram illustrating an example of a functional configuration inside a control unit of the image forming apparatus according to the first embodiment. An example of a method of driving the liquid discharge heads 411 according to the embodiment will be described next by use of FIG. 8, the method being for solving the above described problem.

As described already, pressure oscillation in the ink feeding channel is generated by a change in print duty for image data, and the oscillation period and the damping coefficient are determined by the shape of the ink feeding channel and the viscosity of the ink. Therefore, an image processing unit 601 adds gradation correction to cancel out, by image processing, image density variation upon a change in print duty in a case where a change in print duty is detected and a change in print duty in a predetermined time period is larger than any predetermined value. The following description is on image processing using so-called single pass printing of forming an image by performing a single scan by means of the same nozzle group for the same area of a recording medium, such as a sheet of paper 403.

The control unit 600 of the image forming apparatus 100 according to the embodiment has the image processing unit 601, a recording buffer control unit 602, a correction table selecting unit 603, a mask processing unit 604, and a mask pattern table 605. The head unit 2A includes the head driving unit 20 and the liquid discharge heads (line-type recording heads) 411*y*, 411*m*, 411*c*, and 411*k*. Bitmap data (print data) transmitted from the image processing unit 601 are stored at a predetermined address in a recording buffer by the recording buffer control unit 602. The recording buffer has capacity to store bitmap data corresponding to one page and is a page-by-page ring buffer like a FIFO memory.

The recording buffer control unit 602 controls the recording buffer, starts a printer engine when bitmap data corresponding to one page have been stored in the recording buffer, reads bitmap data from the recording buffer according to a position of each nozzle 301 of the liquid discharge head 411, and inputs the read bitmap data to the mask processing unit 604.

In response to input of bitmap data of the next scan from the image processing unit 601, the recording buffer control unit 602 controls the recording buffer to store the input bitmap data into free space in the recording buffer (an area corresponding to an amount of feeding of the sheet where recording has been completed).

The image processing unit 501 functions as an example of a detection unit that detects a discharge amount of liquid, such as ink, discharged per predetermined time period from the liquid discharge head 411. The control unit 600 functions as an example of a control unit to adjust the discharge amount of ink discharged per predetermined time period from the liquid discharge head 411.

For example, the control unit 600 may adjust the discharge amount of ink discharged per predetermined time period from the liquid discharge head 411 by changing the discharge amount of liquid, such as ink, discharged per unit area to a printed medium, such as a sheet of paper 403. Image density variation due to pressure fluctuation of ink in the channel pipeline is thereby able to be corrected by image processing and this correction is able to be implemented without the need for any additional cost. Furthermore, for example, the control unit 600 may determine, for each type of liquid to be discharged, a method of adjusting the discharge amount of ink discharged per predetermined time period from the liquid discharge head 411. Even if different types of ink having different physical properties are used, image density variation due to pressure fluctuation of ink in the channel pipeline is able to be solved. Furthermore, for example, the control unit 600 may change the method of adjusting the discharge amount of ink discharged per predetermined time period from the liquid discharge head 411, according to temperature of liquid, such as ink, in the channel pipeline. Even if there is a change in temperature, image density variation due to pressure fluctuation of ink in the channel pipeline is thereby able to be solved.

At the same time, the control unit 600 performs correction processing (hereinafter, referred to as correction image processing) of bitmap data on an image, according to a flowchart described later and illustrated in FIG. 9. That is, the control unit 600 divides the bitmap data on the image into lines in order of printing in a scan direction of printing, calculates, for the liquid discharge head 411 of each color, the sums (for example, liquid discharge volumes) $V_1$, $V_2$, $V_3$, . . . , $V_n$, and $V_{n+1}$ of amounts of ink discharged from all of nozzles for that color per a predetermined number of lines (for example, per 100 lines) and in a case where the absolute value of $V_n-V_{n+1}$ is larger than a predetermined value Vc, the control unit 600 performs the correction image processing.

Herein, $V_n$ (a first discharge amount) is the sum (an example of a total amount) of amounts of ink (an example of amounts of liquid) discharged until a first time period elapses from a first time t. Furthermore, $V_{n+1}$ (a second discharge amount) is the sum of amounts of ink discharged from the liquid discharge head 411 until the first time period elapses from a second time t+a that is later than the first time t by the first time period a.

That is, in the correction image processing, on the basis of the value obtained by subtracting $V_{n+1}$ from $V_n$, the control unit 600 adjusts the discharge amount of ink discharged from the liquid discharge head 411 from a time that is later than the second time t+a by the first time period a. Even in a case where high speed printing using a large amount of ink is performed, image degradation due to pressure oscillation generated in the channel pipeline is thereby able to be reduced without increase in the diameter of the channel pipeline for the ink to the liquid discharge head 411, decrease in the length of the channel pipeline, or provision of a damper near the liquid discharge head 411, the damper being for alleviation of pressure fluctuation. As a result, increase in size of the body of the image forming apparatus with improved printing speed is able to be prevented, and variation in density of an image due to pressure fluctuation generated in the channel pipeline is able to be reduced.

The control unit 600 may adjust the discharge amount of liquid, such as ink, discharged from the liquid discharge head 411 only in a case where the value obtained by subtracting $V_{n+1}$ from $V_n$ exceeds a predetermined value. The operation for correcting the image density variation is thereby able to be streamlined, resources for calculation are thereby able to be reduced, and greater effects are thereby able to be achieved, by limiting execution of the correction image processing to cases where the image density variation is more severe.

Specifically, in the correction image processing, the correction table selecting unit 603 selects a correction table for correcting gradation of a mask pattern to be used for a mask of bitmap data, according to the absolute value of $V_n-V_{n+1}$. The correction table selecting unit 603 then applies the selected correction table to a mask pattern selected according to, for example, printing resolution from the mask pattern table 605 that has been stored beforehand and outputs the mask pattern to the mask processing unit 604.

The mask processing unit 604 masks bitmap data stored in the recording buffer, using the mask pattern, per pass recording (per preset line) and outputs the masked bitmap data to the head driving unit 20. The head driving unit 20 rearranges the bitmap data in the order used by the liquid discharge head 411 and transfers the rearranged bitmap data to the liquid discharge head 411.

As to a method of calculating the sum of amounts of ink discharged from the nozzles 3-1 of the liquid discharge head 411, the amounts of ink may be measured by a measurement device, such as a flowmeter, but the sum of amounts of ink may be calculated at low cost without using an additional measurement device by counting different types of droplets, such as large droplets and small droplets and calculating the products of the counts and the liquid droplet discharge volumes of these types of droplets. That is, on the basis of image data, such as bitmap data output to the liquid discharge head 411, the image processing unit 601 may count the number of droplets for each size of droplets of liquid, such as ink, discharged from the liquid discharge head 411 and totaling the numbers of droplets counted, to calculate the total amount of liquid discharged from the liquid discharge head 411 until the first time period a elapses from the first time t or the second time t+a.

The sum of amounts of ink is thereby able to be calculated without using a pressure sensor, for example, and the correction image processing is able to be implemented inexpensively without increasing the size of the apparatus. Furthermore, correction of pressure fluctuation caused in the channel pipelines in real time during printing by increase in the diameter of the channel pipelines for the ink to the liquid discharge heads 411, decrease in the lengths of the channel pipelines, and provision of dampers near the liquid discharge heads 411, the dampers being for alleviating the pressure fluctuation, will not be needed and variation in density of images due to pressure fluctuation generated in the channel pipelines will thus be able to be reduced in a technologically streamlined manner.

On the basis of the absolute value of $V_n - V_{n+1}$, the correction table selecting unit 603 selects a correction table for correcting a mask pattern. Furthermore, the correction table selecting unit 603 corrects the mask pattern by using the correction table selected. The mask processing unit 604 then executes mask processing of bitmap data stored in the recording buffer using the mask pattern corrected.

The correction table selecting unit 603 may select a correction table every time the absolute value of $V_n - V_{n+1}$ becomes larger than the predetermined value Vc and if correction using the correction table previously selected has not been completed, the correction table selecting unit 603 may perform correction redundantly with respect to the remaining correction. That is, the control unit 600 may perform adjustment of the amount of ink discharged from the liquid discharge head 411 over a predetermined second time period b and if the absolute value of $V_n - V_{n+1}$ becomes larger than the predetermined value Vc again while the control unit 600 is performing the adjustment of the discharge amount, newly performed adjustment of the discharge amount may be implemented redundantly with respect to the adjustment of the discharge amount being performed. Performing adjustment redundantly with respect to the adjustment of the discharge amount being performed may mean performing adjustment to a discharge amount obtained by adding a newly adjusted discharge amount to the discharge amount being adjusted. Image density variation due to pressure fluctuation of ink in the channel pipeline for a more common image pattern is thereby also able to be solved, like for when printing of a high density image is made and stopped when residual oscillation is still remaining in the ink feeding channel. Furthermore, the process of selecting a correction table and application of the correction table to a mask pattern table may be implemented at a stage upstream of the control unit 600 in the image forming apparatus 100 or implemented outside the image forming apparatus 100.

Figure 9:
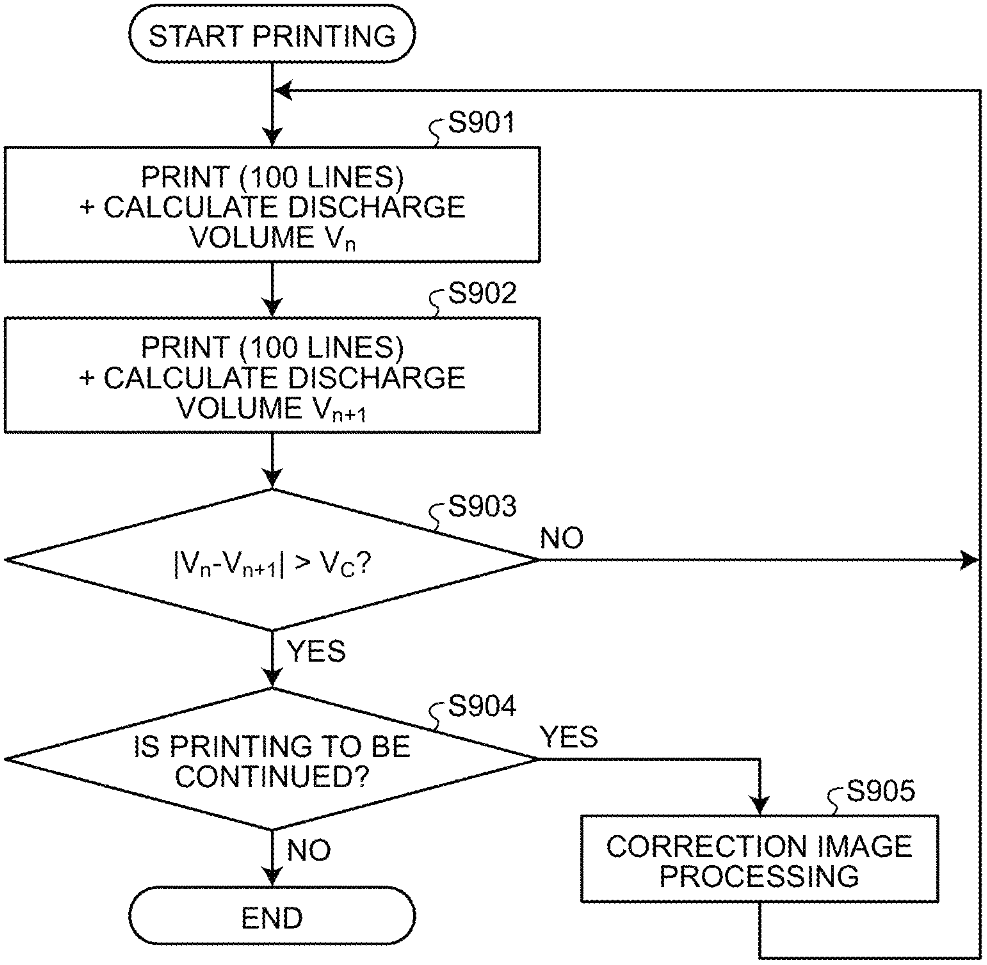
FIG. 9 is a flowchart illustrating an example of a flow of correction image processing at the image forming apparatus according to the first embodiment.

FIG. 9 is a flowchart illustrating an example of a flow of the correction image processing at the image forming apparatus according to the first embodiment. Firstly, the image processing unit 601 calculates a liquid discharge volume $V_n$ that is an example of the sum of amounts of ink for a predetermined number of lines (for example, 100 lines) (Step S901). Furthermore, the image processing unit 601 calculates a liquid discharge volume $V_{n+1}$ that is an example of the sum of amounts of ink in the next predetermined number of lines (for example, 100 lines) (Step S902).

Subsequently, the image processing unit 601 determines whether or not the absolute value of a value obtained by subtracting the liquid discharge volume $V_{n+1}$ from the liquid discharge volume $V_n$ is larger than the predetermined value Vc (Step S903). In a case where the absolute value is equal to or less than the predetermined value Vc (Step S903: No), the control unit 600 returns to Step S901. By contrast, in a case where the absolute value is larger than the predetermined value Vc (Step S903: Yes), the image processing unit 601 determines, on the basis of bitmap data, whether or not printing is to be continued (Step S904). In a case where the printing is not to be continued (Step S904: No), the control unit 600 ends the correction image processing. By contrast, in a case where the printing is to be continued (Step S904: Yes), the control unit 600 executes the correction image processing (Step S905) and thereafter returns to Step S901.

FIG. 10 is a diagram illustrating an example of a correction table that the image forming apparatus according to the first embodiment has. Examples of a method of using a correction table and a method of determining a correction table will be described next by use of FIG. 10.

The method of using a correction table will be described first. The correction table is part of one-dimensional correction values that change over time, the one-dimensional correction values having been arranged according to strength of correction and using these correction values upon printing enables density variation in an image upon a change in print duty to be canceled out by image processing.

In the correction table illustrated in FIG. 10, inequality signs and numbers along a vertical axis represent values of $V_n - V_{n+1}$, numbers and negative or positive signs represent directions and strength of correction values, and numbers along a horizontal axis represent line numbers (for example, 0, 1000, 2000, . . . ) in an operating direction of an image. Therefore, according to the correction table illustrated in FIG. 10, for each value of $V_n - V_{n+1}$ (strength of correction), a correction value for an interval between a line number to the next line number can be read. More correction values are actually available after the line number, 15000, according to an equation described later in relation to the method of determining a correction table, but the correction table illustrated in FIG. 10 has the correction values up to the line number, 15000.

In the method of using the correction table, for example, in a case where $V_n - V_{n+1}$ has become "12", the correction values in the line of ">10" are selected from the correction table illustrated in FIG. 10, the correction table selecting unit 603 thus applies the correction value, "+12", to a mask pattern for the whole liquid discharge head 411 from the line number 1 to the line number 1000 immediately thereafter, and applies the correction value, "+10", to the mask pattern from the line number 1001 to the line number 2000 subsequent thereto. The correction table selecting unit 603 selects the correction values while changing them over time up to the end of the correction table (up to the last line number). The correction values selected are applied line by line to the mask pattern selected from the mask pattern table 605 and a change corresponding to each correction value is made to gradation of the image of the lines in the applied range.

An example of the method of determining (selecting) a correction table will be described next. Pressure oscillation due to inertia of ink that is in the channel up to the liquid discharge head 411, the pressure oscillation being caused by a change in print duty of the liquid discharge head 411, is damped oscillation having a period specific to the ink feeding channel and is able to be expressed by Equation (1) below.

$$x(t) = Ce^{-\zeta\omega_0 t}\cos\left(\omega_0\sqrt{1-\zeta^2}\,t-\alpha\right) \tag{1}$$

In Equation (1), C represents the initial amplitude, $\omega_0$ represents each specific frequency, $\xi$ represents the damping ratio, $\alpha$ represents the phase difference, and x(t) represents the pressure.

The constants in Equation (1) are able to be obtained by actual measurement of pressure fluctuation using an actual system or various simulations, such as an MBD simulation. Therefore, pressure fluctuation over time is able to be obtained from Equation (1) obtained herein, a time period is thus converted to a line number on the basis of the drive frequency of the liquid discharge head 411, and conversion to image density is thus performed on the basis of a conversion formula (for example, the linear approximation curve illustrated in FIG. 7) for converting pressure applied to the liquid discharge head 411 to a liquid droplet discharge volume of ink droplets discharged from the liquid discharge head 411 and a formula for converting a discharge volume found separately by actual measurement, for example, to an image density. Density variation (image density variation) in an image per line is thereby able to be calculated and correction values in a correction table may be determined so that the image density variation becomes 0.

Correction values in the correction table according to the embodiment are set per 1000 lines, but setting the correction values too finely per a small number of lines requires higher calculation capacity and increases the cost of the apparatus and power consumption, while setting the correction values too coarsely per a large number of lines increases density variation at a spot where the correction value is changed in the printed image and makes the density variation visible, and thus setting the correction values too finely or coarsely is not desirable. Therefore, the correction values are desirably set per a well-balanced number of lines.

Specifically, the number of lines is desirably set so that the color difference $\Delta E$ from the targeted pressure for each color becomes equal to or less than 0.7 because the color difference $\Delta E$ will be equal to or less than 1.0 and hardly visible even if a color image is formed. The correction values are set in the form of a correction table herein, but if sufficient calculation capacity is available, correction values may be held in the form of Equation (1) and the correction values may be set per line.

Equation (1) is desirably set for each type of ink because Equation (1) is influenced by the viscosity, density, and bulk modulus of the ink, for example. Similarly, Equation (1) is desirably set for each temperature because Equation (1) is influenced by temperature. For the same reason, the temperature of the feeding system is desirably maintained constant by temperature control.

In a case where the liquid discharge heads 411 are formed by arrangement of a plurality of head modules, are in a staggered arrangement, and perform printing on a recording medium, such as a sheet of paper 403, at different times, the liquid discharge heads 411 that print at the same time are desirably grouped together and the above described correction is desirably performed per group.

Performing dynamic image correction according to a correction table determined as described above enables image density variation upon a change in print duty to be canceled out by image processing.

Accordingly, even in a case where high speed printing using a large amount of ink is performed, the image forming apparatus 100 according to the first embodiment enables reduction of image degradation due to pressure oscillation generated in a channel pipeline without increase in the diameter of the channel pipeline for ink to the liquid discharge head 411, decrease in the length of the channel pipeline, or provision of a damper near the liquid discharge head 411 to alleviate pressure fluctuation, for example. As a result, increase in size of the body of the image forming apparatus 100 with improved printing speed is able to be prevented, and variation in density of an image due to pressure fluctuation generated in the channel pipeline is able to be reduced.

Second Embodiment

This second embodiment is an example where image density variation due to pressure fluctuation of ink in a channel pipeline is corrected at a serial image forming apparatus without increase in the diameter of the channel pipeline for ink to a liquid discharge head 411, decrease in length of the channel pipeline, and provision of a damper near the liquid discharge head 411 to alleviate the pressure fluctuation, for example. Description of components that are the same as those of the first embodiment will hereinafter be omitted.

Figure 11:
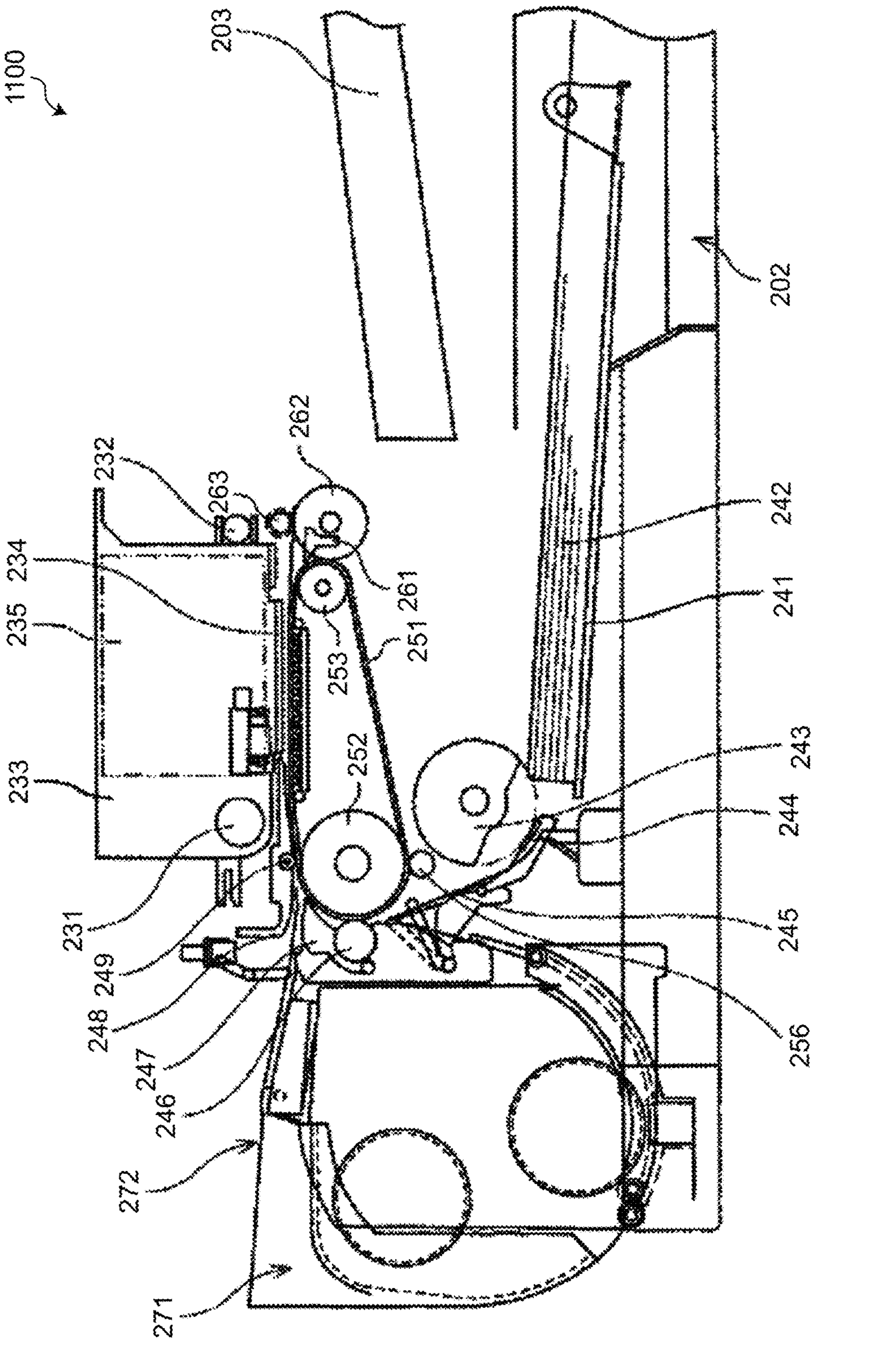
FIG. 11 is a diagram of a schematic configuration illustrating an example of the overall configuration of a mechanical section of an image forming apparatus according to a second embodiment.
Figure 12:
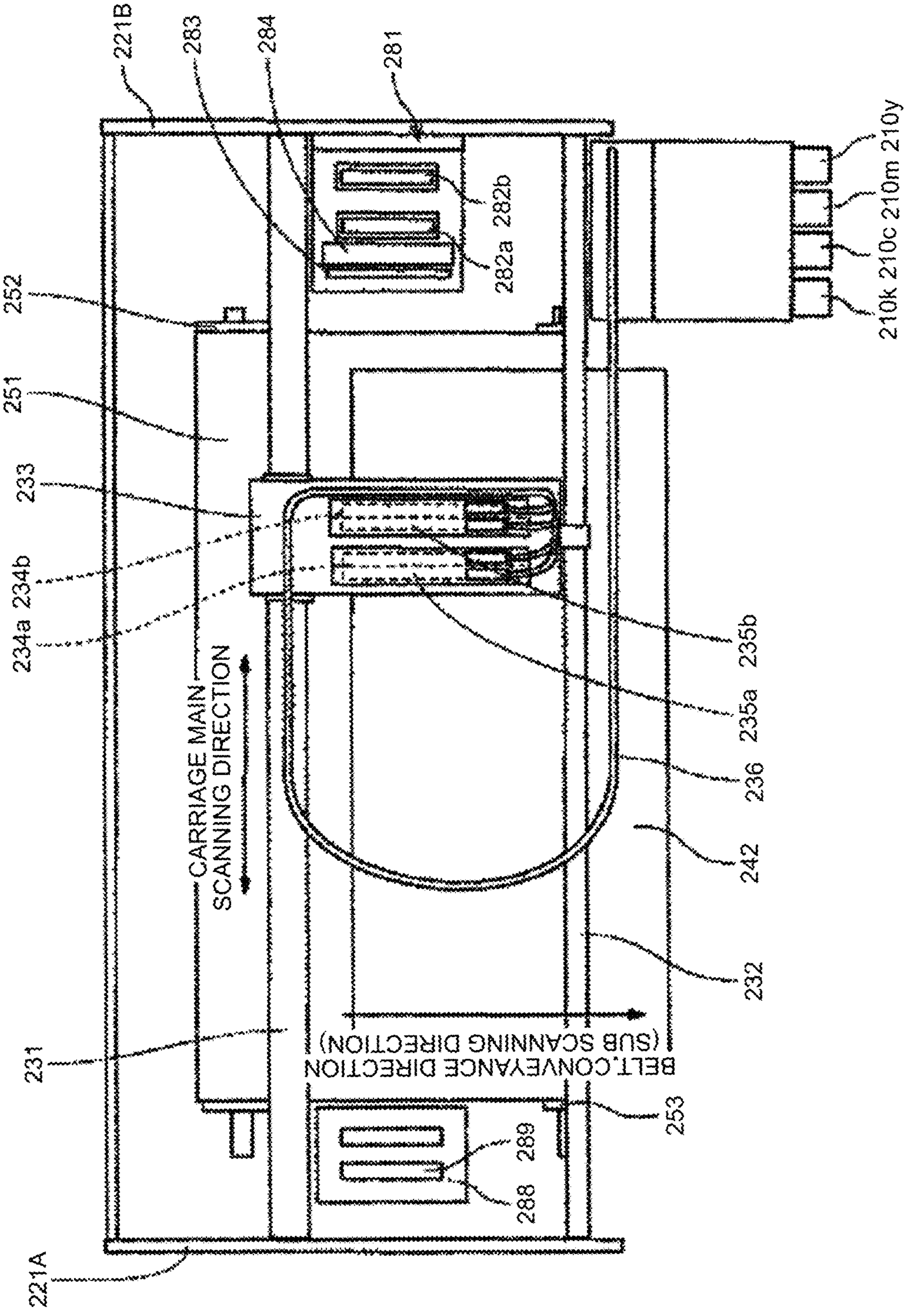
FIG. 12 is a plan view illustrating an example of main parts of the mechanical section of the image forming apparatus according to the second embodiment.

FIG. 11 is a diagram of a schematic configuration illustrating an example of the overall configuration of a mechanical section of the image forming apparatus according to the second embodiment. FIG. 12 is a plan view illustrating an example of main parts of the mechanical section of the image forming apparatus according to the second embodiment. An example of a serial image forming apparatus 1100 including the liquid discharge head 411 according to the embodiment will be described next by use of FIG. 11 and FIG. 12.

The image forming apparatus 1100 according to this embodiment is a serial image forming apparatus and has a carriage 233 that is held by main and auxiliary guide rods 231 and 232 laterally bridging between left and right side plates 221A and 221B, the carriage 233 being held to be slidable in a main scanning direction, and is moved by a main scanning motor, via a timing belt, to perform scanning in a direction indicated by an arrow (carriage main scanning direction).

This carriage 233 has, installed therein, liquid discharge heads 411*a* and 411*b* (each referred to as a liquid discharge head 411 when they are not distinguished from each other) to discharge ink droplets of yellow (Y), cyan (C), magenta (M), and black (K) colors, respectively. The liquid discharge heads 411*a* and 411*b* each have rows of nozzles, the rows each including a plurality of nozzles 3-1 arranged in a sub-scanning direction orthogonal to the main scanning direction, with their ink droplet discharging direction being downward.

The liquid discharge heads 411 each have two rows of nozzles. One of the two rows of nozzles of the liquid discharge head 411*a* discharges black (K) liquid droplets, the other one thereof discharges cyan (C) liquid droplets, one of the two rows of nozzles of the liquid discharge head 411*b* discharges magenta (M) liquid droplets, and the other one thereof discharges yellow (Y) liquid droplets.

The carriage 233 has, installed therein, sub tanks 235*a* and 235*b* (each referred to as a sub tank 235 when they are not distinguished from each other) to supply ink of colors respectively corresponding to the rows of nozzles of the liquid discharge heads 411. The sub tanks 235 are refilled with the ink of the colors supplied from ink cartridges 210 for the colors, via ink feeding tubes 413 (an example of channel pipelines) for the colors. The ink cartridges 210 are an example of tanks that hold the ink.

A sheet feeding section is also included. The sheet feeding section is to feed sheets of paper 403 loaded on a sheet loading unit (pressure plate) 241 of a sheet feeding tray 202 and includes a sheet feeding roller (semilunar roller) 243 to separate and feed the sheets of paper 403 one by one from the sheet loading unit 241 and a separation pad 244 opposite to the sheet feeding roller 243 and made of a material having a large friction coefficient. The separation pad 244 is biased toward the sheet feeding roller 243.

A conveyance belt 251 is also included. To send a sheet of paper 403 fed from the sheet feeding section to a region below the liquid discharge heads 411, the conveyance belt 251 includes a guide member 245 that guides the sheet of paper 403, a counter roller 246, a conveyance guide member 247, and a pressing member 248 having a distal end pressure roller 249, and serves as a conveyance means for conveying the fed sheet of paper 403 at a position opposite to the liquid discharge head 411 by having the fed sheet of paper 403 electrostatically attracted thereto.

This conveyance belt 251 is an endless belt and is configured to be wound around and between a conveyance roller 252 and a tension roller 253 and to move around in a belt conveyance direction (sub-scanning direction). A charging roller 256 serving as a charging means for charging a surface of this conveyance belt 251 is also included. This charging roller 256 is arranged to contact a surface layer of the conveyance belt 251 and to rotate by following the rotational movement of the conveyance belt 251. This conveyance belt 251 rotationally moves in the belt conveyance direction by the conveyance roller 252 being driven to rotate by a sub-scanning motor via timing.

A sheet ejection section to eject a sheet of paper 403 that has been subjected to recording by the liquid discharge heads 411 is also included. This sheet ejection section includes a separation claw 261 to separate the sheet of paper 403 from the conveyance belt 251, a sheet ejection roller 262, and a sheet ejection roller 263, and includes a sheet ejection tray 203 below the sheet ejection roller 262.

A duplex unit 271 has been detachably installed on a back surface portion of the body of the image forming apparatus 1100. The duplex unit 271 takes in a sheet of paper 403 returned by reverse rotation of the conveyance belt 251, reverses the sheet of paper 403 taken in, and feeds the reversed sheet of paper 403 back to a region between the counter roller 246 and the conveyance belt 251. Furthermore, an upper surface of the duplex unit 271 serves as a manual sheet feeding unit 272.

A maintenance and recovery mechanism 281 including a restoration means for maintaining and recovering states of the nozzles 3-1 of the liquid discharge heads 411 has been arranged in a non-printing region near one end of the scan direction length of the carriage 233. This maintenance and recovery mechanism 281 includes, for example, cap members (hereinafter, referred to as caps) 282*a* and 282*b* (each referred to as a cap 282 when they are not distinguished from each other) for respectively capping nozzle surfaces of the liquid discharge heads 411, a wiper blade 283 that is a blade member to wipe the nozzle surfaces, and a mock discharge receiver 284 to receive liquid droplets in mock discharge for discharge of liquid droplets not contributing to recording, for discharge of recording liquid that has thickened.

An ink collection unit (mock discharge receiver) 288 that is a liquid collection container to receive liquid droplets in mock discharge for discharge of liquid droplets not contributing to recording, for discharge of recording liquid (liquid, such as ink) that thickened during recording, for example, has been arranged in a non-printing region near the other end of the scan direction length of the carriage 233, and this ink collection unit 288 includes an opening 289 along a nozzle row direction of the liquid discharge heads 411.

In the image forming apparatus 1100 configured as described above, the sheets of paper 403 are separated and fed one by one from the sheet feeding tray 202, and a sheet of paper 403 fed approximately vertically upward is guided by the guide member 245 and conveyed between the conveyance belt 251 and the counter roller 246. A distal end of the sheet of paper 403 is then guided further by the conveyance guide member 247, pressed against the conveyance belt 251 by the distal end pressure roller 249, and changed in direction of conveyance by approximately 90°.

Alternating voltage is then applied to the charging roller 256 so that positive output and negative output are alternately repeated and the conveyance belt 251 will have an alternately charged voltage pattern, that is, will have positively and negatively charged strips alternately arranged in the sub-scanning direction that is a rotation direction, the positively and negatively charged strips each having a predetermined width. When the sheet of paper 403 is fed onto the conveyance belt 251 that has been alternately charged positively and negatively, the sheet of paper 403 is attracted to the conveyance belt 251, and the sheet of paper 403 is conveyed in the sub-scanning direction by rotational movement of the conveyance belt 251.

Driving the liquid discharge heads 411 according to an image signal while moving the carriage 233 causes ink droplets to be discharged, for recording corresponding to one line, to the sheet of paper 403 that has been stopped, and after the sheet of paper 403 has been conveyed by a predetermined distance, the next line is recorded. In response to receipt of a recording end signal or a signal indicating that the rear end of the sheet of paper 403 has reached the recording region, the recording operation is ended, and the sheet of paper 403 is ejected to the sheet ejection tray 203.

In this serial image forming apparatus 1100 according to the second embodiment, similarly to the first embodiment, in a case where a change in print duty has been detected and a change in print duty in a predetermined time period is larger than any predetermined value, the control unit 600 adds gradation correction to cancel out image density variation upon the change in print duty by correction image processing.

As described above, the serial image forming apparatus 1100 according to the second embodiment also enables image density variation upon a change in print duty to be canceled out and high image quality printing to be performed at high speed.

A program executed by the image forming apparatus 100 or 1100 according to the first or second embodiment is provided by being incorporated in the ROM 640 beforehand, for example. The program executed by the image forming apparatus 100 or 1100 according to the first or second embodiment may be configured to be provided by being recorded in a computer readable recording medium, such as a CD-ROM, a flexible disk (FD), a CD-R, or a digital versatile disk (DVD), in a file having an installable or executable format.

The program executed by the image forming apparatus 100 or 1100 according to the first or second embodiment may be configured to be stored in a computer connected to a network, such as the Internet, and to be provided by being downloaded via the network. Furthermore, the program executed by the image forming apparatus 100 or 1100 according to the first or second embodiment may be configured to be provided or distributed via a network, such as the Internet.

The program executed by the image forming apparatus 100 or 1100 according to the first or second embodiment has a module configuration including the above described units (the image processing unit 601, the recording buffer control unit 602, the mask processing unit 604, and the correction table selecting unit 603), and as to actual hardware, for example, the CPU 610 that is an example of a processor reads and executes the program from the ROM 640, the above described units are thereby loaded into a main storage device, and the image processing unit 601, the recording buffer control unit 602, the mask processing unit 604, and the correction table selecting unit 603 are thereby generated in the main storage device.

An example where an image forming apparatus according to the present invention is applied to a multifunction peripheral having at least two selected from a group including a copy function, a printer function, a scanner function, and a facsimile function is described with respect to the above described embodiments, but the image forming apparatus may be applied to any image forming apparatus, such as a copying machine, a printer, a scanner apparatus, or a facsimile apparatus.

For example, aspects of the present invention are as follows:

<1> An image forming apparatus including:

a tank configured to hold liquid;

one or more channel pipelines communicating with the tank;

at least one liquid discharge head connected to the one or more channel pipelines and configured to discharge the liquid held in the tank;

a detection unit configured to detect a discharge amount of liquid discharged per predetermined time period from the at least one liquid discharge head; and a control unit configured to adjust the discharge amount, wherein in a case where a total amount of liquid discharged from all of the at least one liquid discharge head connected to the one or more channel pipelines until a predetermined first time period elapses from a first time is a first discharge amount and a total amount of liquid discharged from all of the at least one liquid discharge head connected to the one or more channel pipelines until the first time period elapses from a second time later than the first time by the first time period is a second discharge amount, the control unit is configured to adjust the discharge amount from a time later than the second time by the first time period, based on a value obtained by subtracting the second discharge amount from the first discharge amount.

<2> The image forming apparatus according to <1>, wherein the control unit is configured to calculate a total amount of liquid discharged from the liquid discharge head until the first time period elapses from the first time or second time, by counting numbers of liquid droplets discharged from the at least one liquid discharge head for respective sizes of the liquid droplets and totaling the numbers of liquid droplets counted, based on image data output to the liquid discharge head.

<3> The image forming apparatus according to <1> or <2>, wherein the control unit is configured to adjust the discharge amount by changing an amount of liquid discharged to a printed medium per unit area.

<4> The image forming apparatus according to <1>, wherein the control unit is configured to adjust the discharge amount only in a case where the value obtained by subtracting the second discharge amount from the first discharge amount exceeds a predetermined value.

<5> The image forming apparatus according to <4>, wherein the control unit is configured to perform adjustment of the discharge amount over a predetermined second time period, and in a case where a value obtained by subtracting the second discharge amount from the first discharge amount exceeds the predetermined value again while the control unit is performing the adjustment of the discharge amount, perform new adjustment of the discharge amount redundantly with respect to the adjustment of the discharge amount being performed.

<6> The image forming apparatus according to <1>, wherein the control unit is configured to determine a method of adjusting the discharge amount for each liquid to be discharged.

<7> The image forming apparatus according to <1>, wherein the control unit is configured to change a method of adjusting the discharge amount according to a temperature of the liquid in the one or more channel pipelines.

<8> An image forming method executed by an image forming apparatus having a tank configured to hold liquid, one or more channel pipelines communicating with the tank, and at least one liquid discharge head connected to the one or more channel pipelines and configured to discharge the liquid held in the tank, the image forming method including:

detecting a discharge amount of liquid discharged per predetermined time period from the at least one liquid discharge head;

adjusting the discharge amount; and in a case where a total amount of liquid discharged from all of the at least one liquid discharge head connected to the one or more channel pipelines until a predetermined first time period elapses from a first time is a first discharge amount and a total amount of liquid discharged from all of the at least one liquid discharge head connected to the one or more channel pipelines until the first time period elapses from a second time later than the first time by the first time period is a second discharge amount, adjusting the discharge amount from a time later than the second time by the first time period, based on a value obtained by subtracting the second discharge amount from the first discharge amount.

<9> A program that causes a computer configured to control an image forming apparatus including a tank configured to hold liquid, one or more channel pipelines communicating with the tank, and at least one liquid discharge head connected to the one or more channel pipelines and configured to discharge the liquid held in the tank, to function as:

a detection unit configured to detect a discharge amount of liquid discharged per predetermined time period from the at least one liquid discharge head; and a control unit configured to adjust the discharge amount, wherein in a case where a total amount of liquid discharged from all of the at least one liquid discharge head connected to the one or more channel pipelines until a predetermined first time period elapses from a first time is a first discharge amount and a total amount of liquid discharged from all of the at least one liquid discharge head connected to the one or more channel pipelines until the first time period elapses from a second time later than the first time by the first time period is a second discharge amount, the control unit is configured to adjust the discharge amount from a time later than the second time by the first time period, based on a value obtained by subtracting the second discharge amount from the first discharge amount.

An embodiment provides an advantageous effect that, in an image forming apparatus with improved printing speed, it is possible to increase in size of the body and reduction of density variation in an image due to pressure fluctuation that occurs in the ink feeding channel.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image forming apparatus comprising:

a tank configured to hold liquid;

one or more channel pipelines communicating with the tank;

at least one liquid discharge head connected to the one or more channel pipelines and configured to discharge the liquid held in the tank;

a detection unit configured to detect a discharge amount of liquid discharged per predetermined time period from the at least one liquid discharge head; and a control unit configured to adjust the discharge amount, wherein in a case where a total amount of liquid discharged from all of the at least one liquid discharge head connected to the one or more channel pipelines until a predetermined first time period elapses from a first time is a first discharge amount and a total amount of liquid discharged from all of the at least one liquid discharge head connected to the one or more channel pipelines until the first time period elapses from a second time later than the first time by the first time period is a second discharge amount, the control unit is configured to adjust the discharge amount from a time later than the second time by the first time period, based on a value obtained by subtracting the second discharge amount from the first discharge amount.

2. The image forming apparatus according to claim 1, wherein the control unit is configured to calculate a total amount of liquid discharged from the liquid discharge head until the first time period elapses from the first time or second time, by counting numbers of liquid droplets discharged from the at least one liquid discharge head for respective sizes of the liquid droplets and totaling the numbers of liquid droplets counted, based on image data output to the liquid discharge head.

3. The image forming apparatus according to claim 1, wherein the control unit is configured to adjust the discharge amount by changing an amount of liquid discharged to a printed medium per unit area.

4. The image forming apparatus according to claim 1, wherein the control unit is configured to adjust the discharge amount only in a case where the value obtained by subtracting the second discharge amount from the first discharge amount exceeds a predetermined value.

5. The image forming apparatus according to claim 4, wherein the control unit is configured to perform adjustment of the discharge amount over a predetermined second time period, and in a case where a value obtained by subtracting the second discharge amount from the first discharge amount exceeds the predetermined value again while the control unit is performing the adjustment of the discharge amount, perform new adjustment of the discharge amount redundantly with respect to the adjustment of the discharge amount being performed.

6. The image forming apparatus according to claim 1, wherein the control unit is configured to determine a method of adjusting the discharge amount for each liquid to be discharged.

7. The image forming apparatus according to claim 1, wherein the control unit is configured to change a method of adjusting the discharge amount according to a temperature of the liquid in the one or more channel pipelines.

8. An image forming method executed by an image forming apparatus having a tank configured to hold liquid, one or more channel pipelines communicating with the tank, and at least one liquid discharge head connected to the one or more channel pipelines and configured to discharge the liquid held in the tank, the image forming method comprising:

detecting a discharge amount of liquid discharged per predetermined time period from the at least one liquid discharge head;

adjusting the discharge amount; and in a case where a total amount of liquid discharged from all of the at least one liquid discharge head connected to the one or more channel pipelines until a predetermined first time period elapses from a first time is a first discharge amount and a total amount of liquid discharged from all of the at least one liquid discharge head connected to the one or more channel pipelines until the first time period elapses from a second time later than the first time by the first time period is a second discharge amount, adjusting the discharge amount from a time later than the second time by the first time period, based on a value obtained by subtracting the second discharge amount from the first discharge amount.

9. A non-transitory computer-readable medium including programmed instructions that cause a computer configured to control an image forming apparatus including a tank configured to hold liquid, one or more channel pipelines communicating with the tank, and at least one liquid discharge head connected to the one or more channel pipelines and configured to discharge the liquid held in the tank, to function as:

a detection unit configured to detect a discharge amount of liquid discharged per predetermined time period from the at least one liquid discharge head; and a control unit configured to adjust the discharge amount, wherein in a case where a total amount of liquid discharged from all of the at least one liquid discharge head connected to the one or more channel pipelines until a predetermined first time period elapses from a first time is a first discharge amount and a total amount of liquid discharged from all of the at least one liquid discharge head connected to the one or more channel pipelines until the first time period elapses from a second time later than the first time by the first time period is a second discharge amount, the control unit is configured to adjust the discharge amount from a time later than the second time by the first time period, based on a value obtained by subtracting the second discharge amount from the first discharge amount.

* * * * *